United States Patent [19]
Pronovost et al.

[11] Patent Number: 5,333,981
[45] Date of Patent: Aug. 2, 1994

[54] BALE LOADING, TRANSPORTING AND UNLOADING TRAILER

[76] Inventors: Normand Pronovost; Réjean Pronovost, both of St-Tite, Quebec, Canada

[21] Appl. No.: 3,484

[22] Filed: Jan. 12, 1993

Related U.S. Application Data

[63] Continuation-in-part of Ser. No. 749,309, Aug. 26, 1991, abandoned.

[51] Int. Cl.$^5$ .......................................... A01D 90/08
[52] U.S. Cl. ............................... 414/24.5; 414/111; 414/501; 414/551; 414/789.7
[58] Field of Search ........................ 414/24.5, 111, 389, 414/435, 482, 491–493, 501, 509, 551, 679, 789.7

[56] References Cited

U.S. PATENT DOCUMENTS

| | | | |
|---|---|---|---|
| 2,848,127 | 8/1958 | Grey | 414/492 X |
| 3,487,955 | 1/1970 | Brown | 414/111 X |
| 3,521,762 | 7/1970 | Walters | 414/789.7 X |
| 3,638,808 | 2/1972 | Grey et al. | 414/501 X |
| 3,788,495 | 1/1974 | Fachini et al. | 414/789.7 X |
| 3,924,765 | 12/1975 | Hostetler | 414/24.5 |
| 4,008,818 | 2/1977 | Neely, Jr. | 414/509 X |
| 4,329,101 | 5/1982 | Green et al. | 414/24.5 |
| 4,329,102 | 5/1982 | Gray | 414/501 X |
| 4,415,300 | 11/1983 | Boddicker | 414/24.5 |
| 4,549,840 | 10/1985 | Ansbjer | 414/24.5 |
| 4,630,986 | 12/1986 | Taylor | 414/24.5 X |
| 4,718,806 | 1/1988 | Chambers | 414/24.5 |
| 4,789,289 | 12/1988 | Wilson | 414/111 X |
| 4,909,694 | 3/1990 | Peters et al. | 414/24.5 |
| 4,971,504 | 11/1990 | Klompien | 414/24.5 X |
| 5,062,757 | 11/1991 | Eichenauer | 414/24.5 |
| 5,211,345 | 5/1993 | Siebanga | 414/551 X |

FOREIGN PATENT DOCUMENTS

| | | | |
|---|---|---|---|
| 2036591 | 2/1971 | Fed. Rep. of Germany | 414/111 |
| 2620300 | 3/1989 | France | 414/24.5 |
| 2195976 | 4/1988 | United Kingdom | 414/24.5 |
| 8607234 | 12/1986 | World Int. Prop. O. | 414/24.5 |

*Primary Examiner*—Michael S. Huppert
*Assistant Examiner*—James W. Keenan
*Attorney, Agent, or Firm*—Pierre Lespérance; Francois Martineau

[57] ABSTRACT

The bale handling farm trailer comprises an elongated chassis, a front bed frame overlying and coextensive with the chassis and having a flooring secured to and extending across the front section of the front bed frame. The rear end of the latter is pivoted to the rear end of the chassis for pivoting movement to an upwardly tilted bale unloading position. This front bed frame defines a cavity rearwardly of the front bed flooring. A rear bed fits within the cavity and is pivoted to the rear of the front bed frame for movement between a rest position fitting within the cavity and resting on the front bed frame with both bed floorings in alignment and forming a continuous surface to an upright bale unloading position relative to the front bed frame. Hydraulic cylinder and piston units pivot the rear bed with respect to the front bed and the front bed with respect to the chassis. A bale pusher assembly serves to successively move the loaded bales from the back to the rear of the two bed frames. The trailer is equipped with a bale loader which picks up the bales while the trailer is on the run and loads them onto the front bed frame. The loader also serves to rotate the bales so as to bring their axes parallel to the long axis of the trailer. The bales on the rear bed frame can be unloaded as a stack. Alternately, all bales on the two bed frames can be discharged as a horizontal pack.

9 Claims, 5 Drawing Sheets

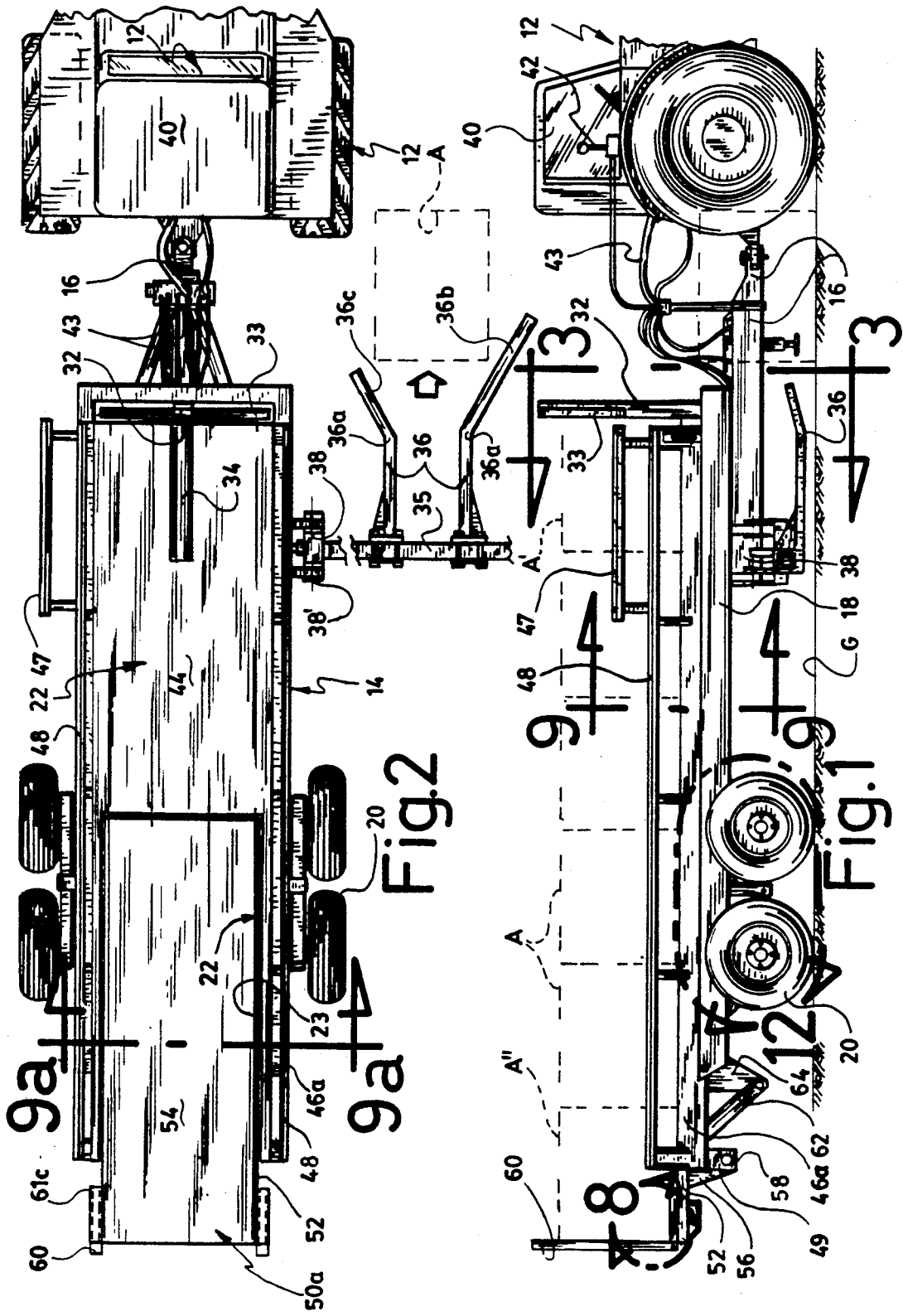

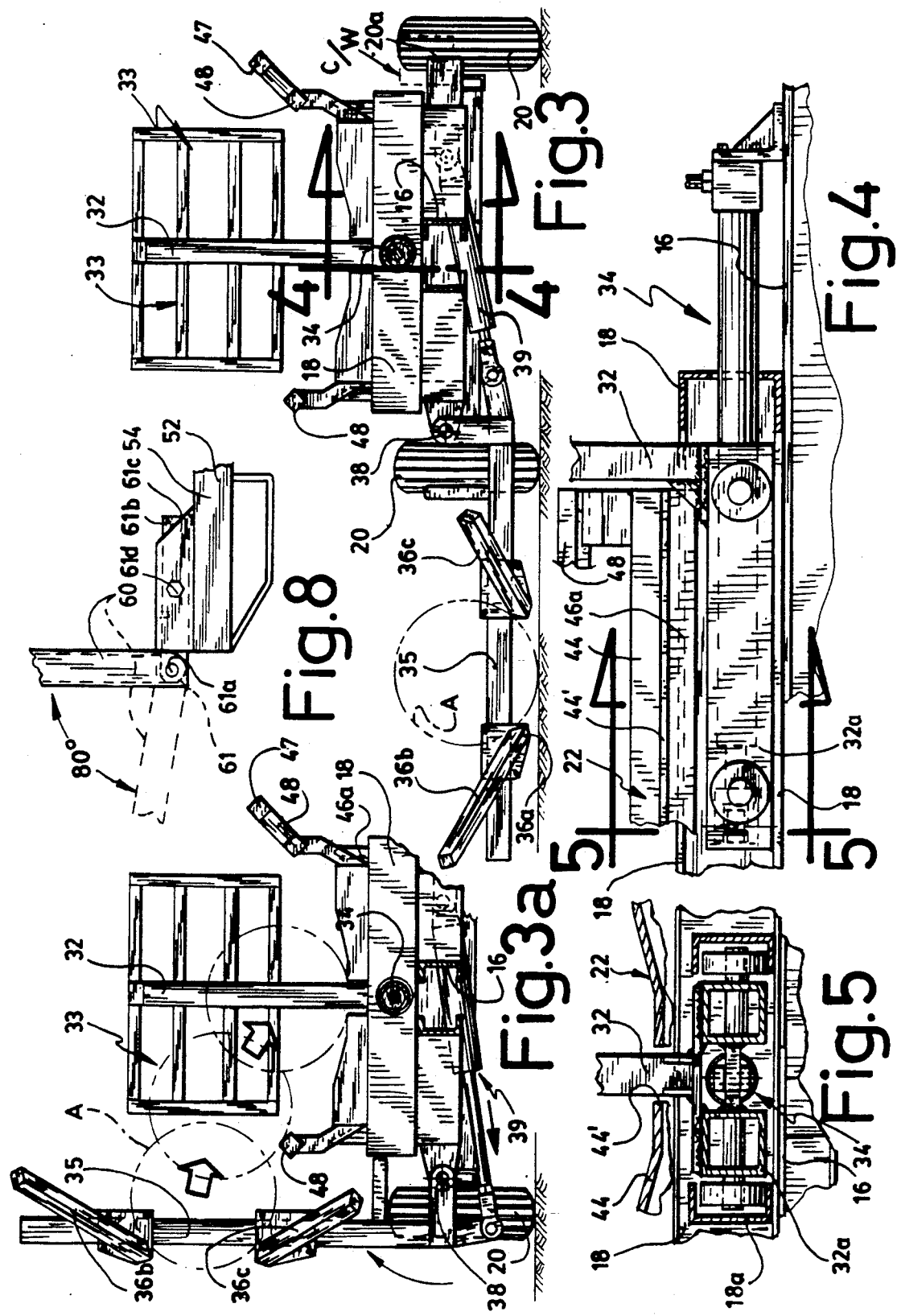

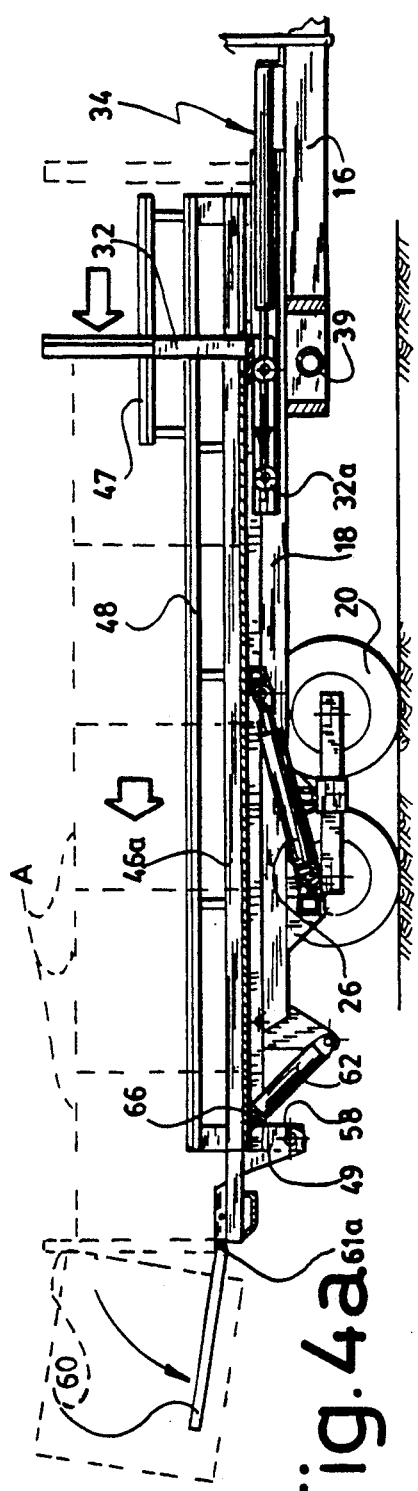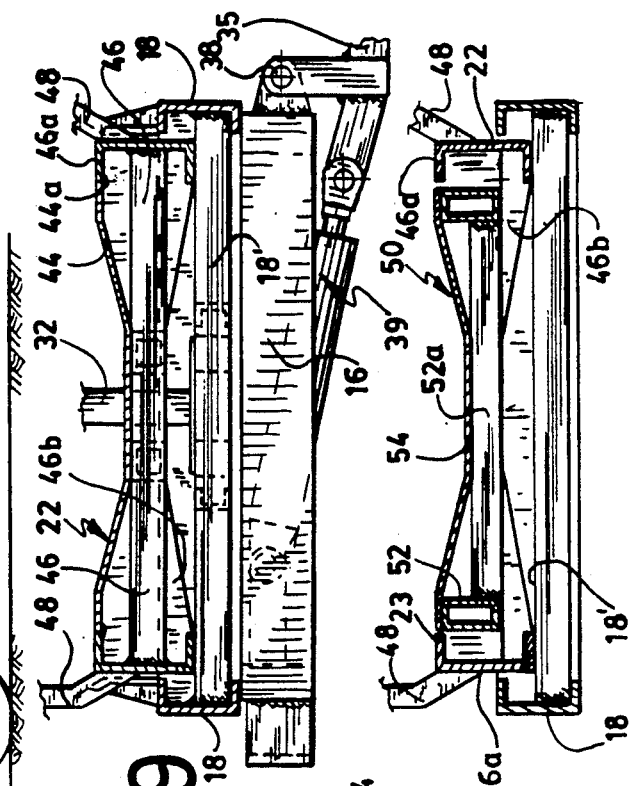

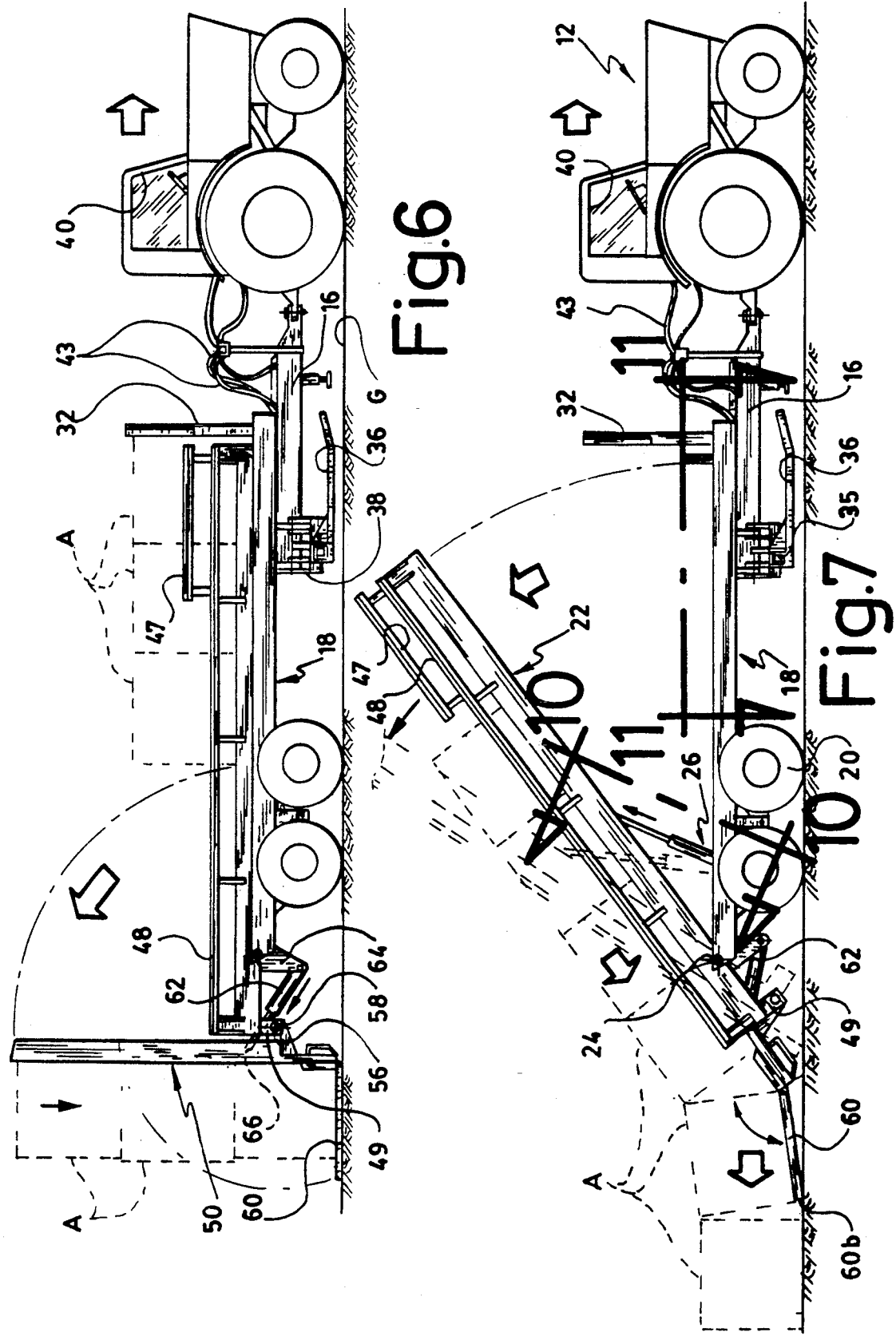

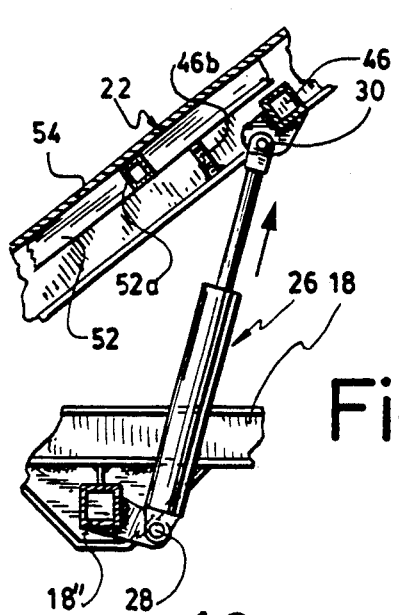
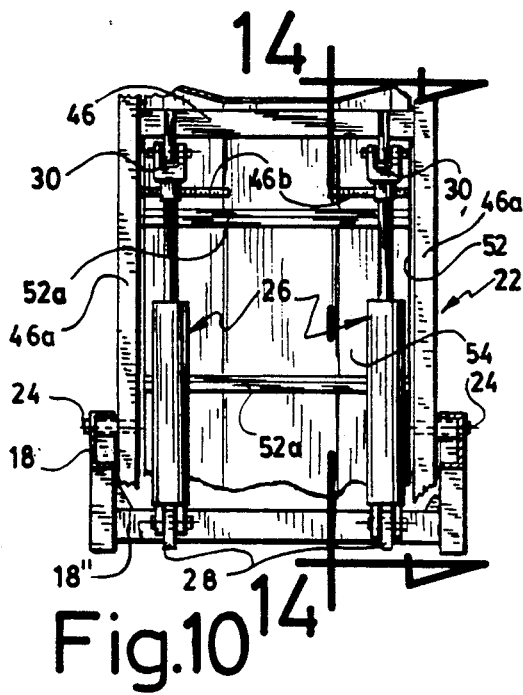
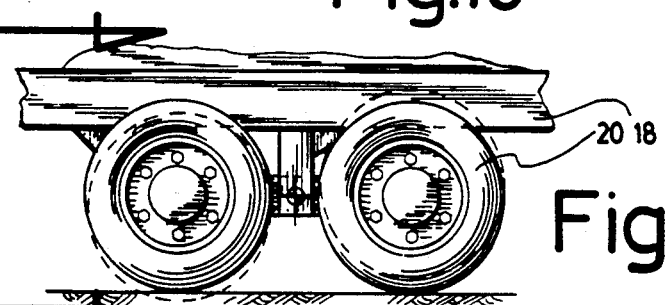
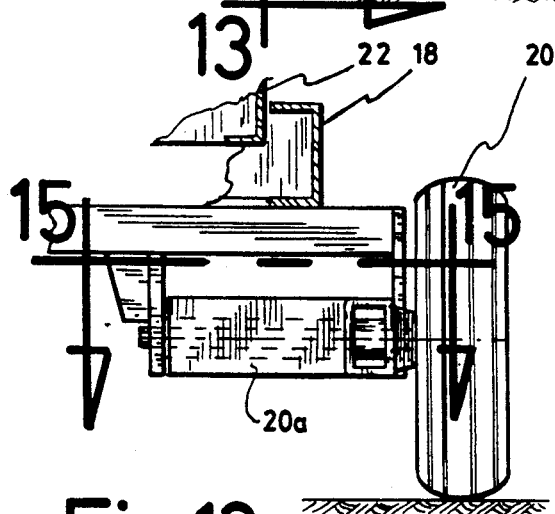
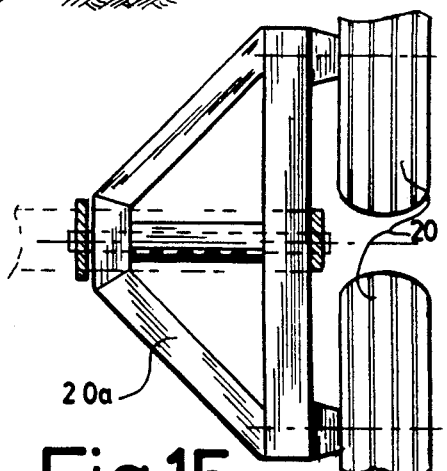

BALE LOADING, TRANSPORTING AND UNLOADING TRAILER

This application is a Continuation-in-Part of application Ser. No. 07/749,309 filed on Aug. 26, 1991, now abandoned.

FIELD OF THE INVENTION

This invention relates to vehicles used for agriculture, and more particularly, to vehicles for capturing, collecting and loading ground scattered bales of hay, straw and/or silage from a farmer's field, and eventually unloading the vehicle loaded bales.

BACKGROUND OF THE INVENTION

In the operation of a modern farm, one important activity is to cut, collect and dispose of the hay crop. Usually, this is done in two steps. First, the hay is cut, gathered in a cylindrical bundle and bound with a cord or wire to form a number of bales weighing up to one ton. This is done with a first dedicated farm tractor and baling implement, driven by a first operator. The tractor and its baling implement roll lengthwisely of the usually rectangular farm fields, about transversely spaced level "rows". The bales are tied in cylindrical bundles and dropped on the ground, in the row, at spaced intervals. The central axis of the cylindrical bales extend transversely of the rows along which roll the tractor. These alleys or rows on the field are smooth and level with the ground, for a smooth ride of the vehicles.

Collecting, loading and transport of the tied bales of hay is then effected by a second operator in a fork lift or the like vehicle, bringing the bales into a transport trailer pulled by another farm tractor driven by a third operator. Eventually, the unloading of the bales from the transport trailer, at the bales storing warehouse or on the field, usually require a fourth worker cooperating with the transport tractor driver.

Thus, four men are required and three different machines are necessary for the complete cycle of bale collecting, loading and storing. This is inefficient.

It is often required to store the bales on the ground either in horizontal packs or in vertical stacks.

OBJECTS OF THE INVENTION

The general object of the invention is to substantially increase the efficiency of farm operations in the collection, transport and storage of bales of hay and the like farm crops.

A more specific object of the invention is to provide a farm trailer which can load bales and then unload the same in horizontal packs or vertical stacks.

Another object of the invention is to provide a farm trailer which is equipped with a bale loader capable of rotating the bales through a quarter turn before loading.

SUMMARY OF THE INVENTION

The farm trailer of the invention is for transporting and unloading generally cylindrical bales of hay and the like and comprises a wheel-mounted elongated chassis having a front and a rear end, a front bed including an elongated front bed frame overlying and co-extensive with said chassis and a front bed flooring secured to and extending across a front section of said front bed frame, the rear section of said front bed frame defining a cavity, said front bed frame pivoted to the rear end of said chassis for pivoting movement between a rest position on said chassis and an upwardly tilted bale unloading position, a rear bed including a rear bed frame and a rear bed flooring secured thereto, said rear bed pivoted to the rear end of said front bed frame between a rest position fitting within said cavity and resting on said front bed frame with both bed floorings in alignment and forming a substantially continuous surface, to an upright bale unloading position relative to said front bed frame; first power means preferably including ram means pivotally connected to said chassis and to said front bed frame to pivot both beds simultaneously between the rest position and the tilted position of said front bed said rear bed remaining in its rest position relative to said front bed; second power means, preferably consisting of second ram means pivotally connected to said front and rear bed frames to pivot said rear bed relative to said front bed between the rest position and the bale unloading position of said rear bed; and bale pusher means movable back and forth over said front bed flooring longitudinally of said chassis to push bales successively loaded on said front bed flooring rearwardly onto said rear bed flooring when both beds are in rest position whereby pivoting of said rear bed to its upright position produces unloading of the bales supported by said rear bed as a stack and pivoting of said front bed to an unloading position produces unloading of the bales supported by both beds as a horizontal pack.

The bale pusher means preferably include a pair of rails fixed to said chassis, a carriage movable in said rails, a post fixed to said carriage and a pusher frame fixed to the upper end of said post, said carriage movable rearwardly from a foremost position in which said post and frame are disposed forwardly of and clear the front end of said front bed flooring, said post freely extending through a slit made in said front bed flooring when said carriage takes positions rearwardly of said foremost position whereby said pusher frame can move back and forth over said front bed flooring when the latter is in rest position and clears said bed flooring front edge in the foremost position of said carriage to permit tilting of said front bed.

Preferably, the trailer of the invention further includes a bale loader movably mounted on said chassis in register with a forward portion of said front bed and projecting laterally from said chassis for picking up bales from the ground on-the-run and means for moving said loader to transfer a picked up bale onto said forward portion, said loader including an inboard and an outboard bale support member, both members laterally spaced and substantially parallel and straight and in the direction of travel of said vehicle for passing under a bale having its axis parallel to said direction of travel. Both support members having a front bend extended by a forward extension, both bends lying in a straight line substantially normal to said direction of travel, both extensions being divergent in a horizontal plane and upwardly inclined in a vertical plane and in said direction of travel. The forward extension of said outboard support member is longer and projects forwardly beyond the forward extension of said inboard support member whereby the forward extension of said outboard support member can engage and rotate through 90 degrees a round bale which has its axis normal to said direction of travel so as to be subsequently picked up by said pair of support members.

The invention is also directed to the bale loader per se.

BRIEF DESCRIPTION OF THE DRAWINGS

FIG. 1 is a side elevational view of part of a tractor and of the trailer according to the invention, showing six loaded hay bales in phantom lines;

FIG. 2 is a top plan view of the tractor and bale trailer, suggesting how the lateral grabber arms can capture for loading a ground-standing bale shown in phantom lines;

FIG. 3 is a sectional view along line 3—3 of FIG. 1, showing the bale loading fork members in their laterally extended, ground-skimming position;

FIG. 3a is a partial view of FIG. 3, but with the bale loading arm being in its upright, retracted position;

FIG. 4 is an enlarged, fragmentary, sectional view along line 4—4 of FIG. 3;

FIG. 4a is a view similar to FIG. 4 but at a smaller scale and showing most of the trailer and the loaded bales in phantom lines, and further suggesting how the rear upright bars can be tilted to make room for transporting an additional bale and for horizontal bale unloading;

FIG. 5, on the second sheet of drawings, is a cross-sectional view about line 5—5 of FIG. 4;

FIG. 6, on the fourth sheet of drawings, is a view similar to that of FIG. 1, but suggesting how the rear bed can be tipped relative to the front bed to unload only the bales resting on the rear bed in a stack;

FIG. 7 is a view similar to that of FIG. 6, but showing how both the front bed and rear bed are tipped as a unit to unload all the bales in a horizontal pack;

FIG. 8, on the second sheet of drawings, is an enlarged view of the area circumscribed by circle 8 of FIG. 1, showing the pivotal play of the rear end bars;

FIG. 9, on the third sheet of drawings, is an enlarged cross-sectional view taken along line 9—9 of FIG. 1;

FIG. 9a is an enlarged cross-sectional view taken along line 9a-9a of FIG. 2;

FIG. 10, on the last sheet of drawings, is an enlarged elevation of the front bed underface, taken about inclined perspective 10—10 of FIG. 7;

FIG. 11, on the third sheet of drawings, is a top plan view of the vehicle chassis beneath the front bed frame, and taken about perspective 11—11 of FIG. 7, and suggesting how is effected the lengthwise play of the bale pusher operating ram means;

FIG. 12, on the last sheet of drawings, is an enlarged view of the area circumscribed by ellipse 12 of FIG. 1, showing the tandem wheels of the trailer;

FIG. 13 is an enlarged, elevational, cross-sectional view about line 13—13 of FIG. 12;

FIG. 14 is a cross-sectional view of the rear and front beds and associated trailer chassis, taken along line 14—14 of FIG. 10; and FIG. 15 is a sectional plan view about lines 15—15 of FIG. 13, detailing the tandem wheels of the trailer.

DETAILED DESCRIPTION OF THE INVENTION

A front tractor 12 pulls a rear trailer 14 via a hitch 16. Trailer 14 consists of an open, quadrangular (FIG. 11), tubular, elongated, planar chassis 18, under the front portion of which a hitch 16 is secured. Chassis 18 is supported by two pairs of rear wheels 20 on a tandem frame 20a. The chassis 18 supports a front bed 22 which includes a front bed frame 46, 46a and a front bed flooring 44. The front bed frame is composed of two longitudinal members 46a interconnected by transverse frame members 46. The longitudinal frame members 46a are co-extensive with and rest upon the chassis 18 in the rest position of the front bed. The front bed flooring 44 only extends across the front portion of the front bed frame and, therefore, there is a rearwardly disposed cavity 23 defined at the back of the flooring 44 and between the longitudinal frame members 46a. The latter are pivotally connected at 24 near their rear ends to the rear end of the chassis 18 for tilting movement of the front bed 22 from its rest position as shown in FIG. 6 to a bale unloading position as shown in FIG. 7. Tilting movement is effected by a pair of hydraulic rams 26 which are pivotally connected to the chassis 18 and to the front bed frame at 28 and 30 respectively (see FIGS. 10 and 14). More particularly, the pivot connection 28 is to a transverse frame member 18" of the frame 18 while the pivot connection 30 is to a transverse frame member 46 of the front bed frame. A rear bed 50 is mounted on the front bed 22. More particularly, the rear bed 50 includes a rear bed frame 52, 52a fitted with a flooring 54. The rear bed frame is composed of longitudinal frame members 52 and cross frame members 52a (see FIGS. 10 and 14). This rear bed frame fits within the cavity 23 defined between the longitudinal frame members 46a of the front bed frame. The frame members 52 of rear bed 50 are provided at their rear portion with downwardly extending brackets 56 which are connected by means of the pivot 58 to similar brackets 49 depending from the rear ends of front bed frame members 46a. The rear bed 50 can be pivoted with respect to the front bed 22 by means of hydraulic rams 62 each pivoted at one end to a bracket 64 which is secured to the rear portion of the front bed frame members 46a while the other ends of the rams 62 are pivoted at 66 to the rear bed frame 50. Thus, the rear bed frame can pivot between a rest position in which its flooring 54 nests within the cavity 23 and is in alignment with the front bed flooring 44 forming a continuous bale supporting surface with said front bed flooring, and a vertically tilted position, as shown in FIG. 6, whereby the bales of hay A supported by the flooring 54 can be unloaded as a stack, while the remaining bales not transfered on the rear bed remain on the front bed (see FIG. 6).

In the rest position of the rear bed, its longitudinal frame members 52 may simply rest either directly on a cross member 46 of the front bed frame or on transverse supports 46b secured to the front bed frame members 46a as shown in FIG. 10 and 14.

Pusher means are provided for successively pushing the round bales A which have been previously loaded on the front section of the front bed flooring 44 rearwardly on said flooring and then on the rear bed flooring 54. Said pusher means include an upright post 32 fitted with a transversely extending pusher frame 33 at its top end. The post 32 freely extends through a slit 44' which is made longitudinally and centrally of the front bed flooring 44 and which opens at the front edge of said flooring 44 as shown in FIG. 2. Referring to FIGS. 4, 5, and 11, the lower end of post 32 is fixed to a wheeled carriage 32A which is movably guided by a pair of rails 18a fixed to the transverse cross members 18' of the chassis 18. The carriage is movable back and forth under the action of a double acting hydraulic cylinder 34 attached to the carriage 32a and to the hitch frame 16 as shown in FIG. 4. In the foremost position of the carriage, post 32 clears the front edge of the front bed flooring 44 so as that the front bed can be tilted to its bale unloading position as shown on FIG. 7. When the front bed is in horizontal position, post 32 can move back and forth freely through the longitudinal central slit 44' of the front bed flooring 44. The stroke of pusher assembly 32-33 is slightly more than the thickness of the hay bales A which are to be loaded on the front bed 22 with their axes parallel to the direction of travel of the front trailer.

The invention further includes a baler loader which comprises a laterally protruding loader bar 35 from which frontwardly projects a pair of spaced parallel fork lift like bale support arms 36. Bar 35 is pivotally mounted to the hitch frame 16 through a pivot mount 38 having a pivotal axis 38' parallel to the longitudinal axis of the chassis 18 as shown in FIG. 2. In a lowered position, the arms 36 are designed to skim the surface of the ground G laterally outwardly of the vehicle 14 to pick up bales A on the run, that is when the tractor 12 pulling the trailer 14. Arms 36 extend forwardly and are spaced and parallel to each other to support a bale A with its axis parallel to the direction of travel of the vehicle 14. The two arms 36 are bent at 36a and have a front extension 36b and 36c respectively. The two bends 36a are disposed along a straight line which is normal to the direction of travel of the trailer 14', the two extensions 36b and 36c are forwardly diverging when looked at in a horizontal plane and are upwardly and forwardly inclined when looked at in a vertical plane. The extension 36b of the outboard arm 36 is longer than and projects forwardly beyond the extension 36c of the inboard arm 36. If a round bale A does not lie with its axis parallel to the direction of travel of the vehicle 14, then it can be engaged by the longer extension 36b which will pivot the bale through a quarter turn so that its axis is now parallel to the direction of travel and ready to be engaged by the two arms 36.

A hydraulic ram 39, shown in FIGS. 1, 2, 3, and 3a, serves to pivot the loader bar 35 and the support arms 36 from the horizontal bale pick up position of FIG. 3 to the vertical, trailer bed bale loading position of FIG. 3a. The bales A are discharged over a near side balustrade 48 and are prevented from escaping over the far side of the front bed by the presence of a far side balustrade 48 and also a rail 47 fixed to and protruding above the far side balustrade 48 opposite the bale loader.

Balustrades 48 extend along the entire length of the two bed frames being secured to the two front bed frame members 46a.

Referring to FIGS. 9 and 9a, it is noted that the front bed flooring 44 and rear bead flooring 54 are both centrally recessed to better maintain the hay bales A properly centered on the trailer beds with their axes parallel to the longitudinal axis of said trailer bed.

The ram means 26, 34, 39 and 62 are all operated by the tractor operator which sits in the tractor cabin 40 and operates the hydraulic control levers 42, the hydraulic fluid being transmitted to the various rams by the hydraulic hoses 43 (see FIGS. 6 and 7).

In order to stabilize the trailer during bale loading, a counterweight indicated at CW is supported by a bracket 68 fixed to the chassis 18 transversely opposite the loader bar 35 as shown in FIG. 11.

Bale retainer bars 60 are mounted at the rear end of the rear bed 50. The inner end 61 of each bar 60 is pivoted at 61a to a stud 61b which is slidably inserted within a sleeve 61c and retained therein by a tightener bolt 61d. Sleeve 61c is fixed to the rear end portion of the rear bed frame members 52. The bars 60 can be maintained in upright position normal to the rear bed flooring 54 as shown in FIGS. 1, 6 or 8, or at an upwardly inclined position at 80 degrees to the first position as shown in FIG. 4a and in dotted lines in FIG. 8. In the last-named position, the trailer can be loaded with an extra bale A as shown in FIG. 4a. When the bars are in upright position, a standard number of bales can be loaded on the trailer, for instance five bales as shown in FIG. 4a and also the bales are retained when the rear bed is pivoted to unloading position as shown in FIG. 6. Once the bales on the rear bed form a stack, the trailer is pulled forwardly to release the bars 60 from underneath the stack. If necessary, the bed 50 can be tipped through more than 90 degrees.

Referring to FIG. 6, it is noted that only the bales that were transferred to the rear bed are discharged as a stack and the remaining bales can be discharged as a stack at another location on the field after being transferred from the front bed flooring to the rear bed flooring. This transfer can be effected by the pusher assembly 32, 33 and also by tilting both beds as a unit.

For discharging the entire load as a horizontal pack, the two beds are tipped as a unit as shown in FIG. 7 with the bars 60 lying on the ground and free to move upwardly from the dotted line position of FIG. 8.

I claim:

1. A farm trailer for transporting and unloading generally cylindrical bales of hay comprising:
    (a) a wheel-mounted elongated chassis having a front and a rear end;
    (b) a front bed including an elongated front bed frame having a front section and a rear section, said front bed frame overlying and co-extensive with said chassis and a front bed flooring secured to and extending across said front section, said rear section defining a cavity;
    (c) said front bed frame pivoted to the rear end of said chassis for pivoting movement of said front bed between a rest position resting on said chassis and an upwardly tilted bale unloading position;
    (d) a rear bed including a rear bed frame and a rear flooring secured thereto, said rear bed frame pivoted to the rear section of said front bed frame for pivoting movement of said rear bed between a rest position with said rear flooring fitting within said cavity and with both bed floorings in alignment and forming a substantially continuous surface, to an upright bale unloading position relative to said front bed;
    (e) first power means to pivot both beds simultaneously between the rest position and the tilted position of said front bed, said rear bed remaining in its rest position relative to said front bed;
    (f) second power means to pivot said rear bed relative to said front bed between the rest position and the bale unloading position of said rear bed; and
    (g) bale pusher means movable back and forth over said front bed flooring longitudinally of said chassis to push bales successively loaded on said front bed flooring rearwardly onto said rear flooring when both beds are in rest position whereby providing of said rear bed to its upright position produces unloading of the bales supported by said rear bed as a stack, and pivoting of said front bed to an unloading position produces unloading of the bales supported by both beds as a horizontal pack.

2. A farm trailer as defined in claim 1, wherein said first power means includes first ram means pivotally connected to said front bed frame and to said chassis and said second power means includes second ram means pivotally connected to said front and rear bed frames.

3. A farm trailer as defined in claim 2, further including a bale loader movably mounted on said chassis in register with a forward portion of said front bed flooring and projecting laterally from said chassis for picking up bales from the ground when said farm trailer is travelling in a given direction of travel and means for moving said loader to transfer a picked up bale onto said forward portion, said loader including an inboard and an outboard support member, both members laterally spaced and substantially parallel and straight and projecting in said direction of travel for passing under a bale in a position for pick-up with its axis parallel to said direction of travel, both support members having a front bend extended by a forward extension, both bends lying on a straight line substantially normal to said direction of travel, both extensions being divergent in a horizontal plane and upwardly inclined in a vertical plane in said direction of travel, the forward extension of said outboard support member to engage and rotate to its pick-up position a bale out of said position before sad members pass under said bale.

4. A farm trailer as defined in claim 3, wherein said front bed flooring has a front edge and a central longitudinal slit opening at said front edge, said bale pusher means including a pair of rails fixed to said chassis, a carriage movable in said rials, a post fixed to said carriage and a pusher frame fixed to said post, said carriage movable rearwardly from a foremost position in which said post and pusher frame are disposed forwardly of and clear said front edge of said front flooring to permit tilting of said front bed, said post freely extending through said slit and said pusher frame disposed above and front flooring when said carriage takes positions rearwardly of said foremost position and said front bed is in its rest position whereby said pusher frame can move back and forth over said front bed flooring.

5. A farm trailer as defined in claim 2, wherein said front bed flooring has a front edge and a central longitudinal slit opening at said front edge, said bale pusher means including a pair of rails fixed to said chassis, a carriage movable in said rials, a post fixed to said carriage and a pusher frame fixed to said post, said carriage movable rearwardly from a foremost position in which said post and pusher frame are disposed forwardly of and clear said front edge of said front flooring to permit tilting of said front bed, said post freely extending through said slit and said pusher frame disposed above said front flooring when said carriage takes positions rearwardly of said foremost position and said front bed is in its rest position whereby said pusher frame can move back and forth over said front bed flooring.

6. A farm trailer as defined in claim 1, further including a bale loader movably mounted on said chassis in register with a forward portion of said front bed flooring and projecting laterally from said chassis for picking up bales from the ground when said farm tractor is travelling in a given direction of travel and means for moving said loader to transfer a picked up bale onto said forward portion, said loader including an inboard and an outboard support member, both members laterally spaced and substantially parallel and straight and projecting in said direction of travel for passing under a bale in a position for pick up with its axis parallel to said direction of travel, both support members having a front bend extended by a forward extension, both bends lying on a straight line substantially normal to said direction of travel, both extensions being divergent in a horizontal plane and upwardly inclined in a vertical plane in said direction of travel, the forward extension of said outboard support member being longer than and projecting forwardly beyond the forward extension of said inboard support member to engage and rotate to its pick-up position a bale out of said position before said members pass under said bale.

7. A farm trailer as defined in claim 6, wherein said front bed flooring has a front edge and a central longitudinal slit opening at said front edge, said bale pusher means including a pair of rails fixed to said chassis, a carriage movable in said rials, a post fixed to said carriage and a pusher frame fixed to said post, said carriage movable rearwardly from a foremost position in which said post and pusher frame are disposed forwardly of and clear said front edge of said front flooring to permit tilting of said front bed, said post freely extending through said slit and said pusher frame disposed above said front flooring when said carriage takes positions rearwardly of said foremost position and said front bed is in its rest position whereby said pusher frame can move back and forth over said front bed flooring.

8. A farm trailer as defined in claim 1, wherein said front bed flooring has a front edge and a central longitudinal slit opening at said front edge, said bale pusher means including a pair of rails fixed to said chassis, a carriage movable in said rails, a post fixed to said carriage and a pusher frame fixed to said post, said carriage movable rearwardly from a foremost position in which said post and pusher frame are disposed forwardly of and clear said front edge of said front flooring to permit tilting of said front bed, said post freely extending through said slit and said pusher frame disposed above said front flooring when said carriage takes positions rearwardly of said foremost position and said front bed is in its rest position whereby said pusher frame can move back and forth over said front bed flooring.

9. A farm trailer for transporting and unloading generally cylindrical bales of hay comprising a wheel-mounted elongated chassis having a front end and a rear end, a bale receiving bed supported by said chassis, a bale loader movably mounted on said chassis and projecting laterally from said chassis for picking-up bales from the ground when said farm trailer is travelling in a given direction of travel, and means for moving said loader to transfer picked-up bales onto said bed, said loader including an inboard and an outboard support member, both members laterally spaced and substantially parallel and straight and projecting in said direction of travel for passing under a bale in a position for pick-up with its axis parallel to said direction of travel, both support members having a front bend extended by a forward extension, both bends lying on a straight line substantially normal to said direction of travel, both extensions being divergent in a horizontal plane and upwardly inclined in a vertical plane in said direction of travel, the forward extension of said outboard support member being longer than and projecting forwardly beyond the forward extension of said inboard support member to engage and rotate to its pick-up position a bale out of said position before said members pass under said bale.

* * * * *